UNITED STATES PATENT OFFICE.

GUIDO BLENIO, OF NEW YORK, N. Y., ASSIGNOR TO BLENIO PRODUCTS CORPORATION, OF NEW YORK, N. Y., A CORPORATION OF DELAWARE.

DRY MIXTURE FOR FIRE AND WATER PROOF PAINT.

1,382,617.   Specification of Letters Patent.   Patented June 28, 1921.

No Drawing. Application filed January 7, 1919, Serial No. 270,026. Renewed November 16, 1920. Serial No. 424,759.

*To all whom it may concern:*

Be it known that I, GUIDO BLENIO, a citizen of the United States, residing at New York city, in the county of New York, State of New York, have invented certain new and useful Improvements in a Dry Mixture for Fire and Water Proof Paint, of which the following is a description.

My invention relates to fire proof paints and has for its object to produce a paint which will be water proof as well as fire proof, will be well adapted for application to the surfaces on which it is to be used either by a brush or by a spraying device, will form a tough, elastic, durable coating equal in appearance to the best paint, and may be used for either outside or inside work, and at the same time will be inexpensive and will be adapted to be sold as a powder to be mixed with water.

With these and other objects hereinafter explained, in view, my invention consists in the composition of matter for paint hereinafter described and claimed.

My paint belongs to the class of paints sometimes termed "distemper paints," that is water paints as distinguished from oil paints, and consisting broadly in a filler usually of mineral nature, and a binder usually an adhesive such as glue which is soluble in water. Such paints are prepared and sold in powder form and in order to be used are mixed with water.

My invention includes an improvement in the filler and particularly, an improvement in the binder.

The filler of my paint is made up of magnesite, calcined and powdered, calcium carbonate, such as whiting, china clay (kaolin) and calcium hydrate, mixed in proportions hereinafter specified; the binder consists in a mixture of casein, or albumen either blood albumen or egg albumen, a neutral soap powder, preferably tallow soap powder, and a water proofing powder such as is used for water proofing Portland or other cement, preferably calcium stearate.

A preferred composition of my paint is made up in the following proportions—

| | |
|---|---|
| Calcined magnesite | 15 parts |
| Calcium carbonate | 25 parts |
| China clay | 30 parts |
| Calcium hydrate | 7 parts |
| Casein | 14 parts |
| Water proofing powder | 6 parts |
| Neutral soap powder | 3 parts |

This will give a white paint. If a colored paint is desired, a sufficient amount of dry powdered pigment to give the color desired is substituted for part of the calcium carbonate so that the pigment with the remainder of the calcium carbonate will together amount to 25 parts.

All of these materials may be readily obtained on the market in finely powdered form. The casein, or albumen, and the water proofing powder may also be readily obtained. The soap powder should, preferably, be made specially as it is important that it be made of tallow, or pure vegetable oil, preferably tallow, and that the fat be saponified with sodium carbonate and that only so much sodium carbonate be used as will be just sufficient to effect the saponification, any excess of alkali being objectionable.

The ingredients, all in the form of dry powder, should be thoroughly mixed preferably first in a paint mixer and then by running the mixture through a stone mill so as to thoroughly mix the materials.

The proportions of the ingredients may be varied somewhat from those above stated, the proportions above stated being particularly adapted for outside work where the paint will be subjected to severe weather conditions. For inside work the proportion of casein is preferably from 8 to 12 parts only and the proportion of the waterproof powder and the soap powder may be somewhat reduced. The casein may be used in from 12 to 16 parts for outside work, the waterproof powder in from 2½ to 10 parts and the soap powder in from 2½ to 5 parts.

In use, the dry mixture above described should first be mixed with a small quantity of water, preferably in the proportion of one measure of water to three measures of the powder, and stirred until a smooth, creamy mixture is formed. This should be allowed to stand a few minutes and water may then be added in sufficient quantity to form a liquid of suitable consistency for use with a brush or a spraying device.

If commercial casein is used it should be tested for acidity before being used and any acidity corrected by a suitable alkali or by increasing the proportion of calcium hydrate in the mixture.

The paint above described is fire proof and water proof, dries quickly and presents a smooth hard surface which is highly elastic so that it does not crack or blister under the most severe weather conditions. It adheres readily to galvanized iron and the galvanized iron to which it is applied may be bent without causing the paint to crack or peel off. It also adheres to brick or cement walls and to all surfaces to which oil paint will adhere. The binder composed as above described gives to the paint a smoothness corresponding to that given to oil paint by linseed oil which makes it easy to apply and gives an even coating. The paint may be used as a substitute not only for other water paints but for oil paints as it works as easily and smoothly as oil paint and gives a coating which in appearance, durability, elasticity, resistance to changes in temperature and other advantageous qualities is fully equal to the best oil paint.

The paint is particularly desirable for use in hospitals or other places where sanitation is especially important as it gives a coating which is not only smooth, hard and waterproof so that it can be washed without injury but is resistant to both acids and alkalis and can be washed if necessary with strong disinfectant solutions without injury and not only gives no lodgment to germs but by reason of the magnesite and alkali present in it is itself more or less antiseptic.

Having thus described my invention what I claim is:

1. In a dry mixture for paints, a filler of mineral material, and a binder comprising a neutral soap and a waterproofing compound.

2. In a dry mixture for paints, a filler of mineral material, and a binder comprising a neutral soap, casein and a waterproofing compound.

3. In a dry mixture for paints, a filler comprising calcined magnesite, calcium carbonate, china clay, and calcium hydrate, and a binder comprising casein, a neutral soap and a waterproofing compound.

4. In a dry mixture for paints, a filler comprising calcined magnesite 15 parts, calcium carbonate 25 parts, china clay 30 parts, calcium hydrate 7 parts, and a binder comprising casein, a neutral soap and a waterproofing compound.

5. In a dry mixture for paints, a filler composed of calcined magnesite 15 parts, calcium carbonate 25 parts, china clay 30 parts, calcium hydrate 7 parts and a binder composed of casein 14 parts, neutral soap 3 parts, and waterproofing compound 6 parts.

In testimony whereof I affix my signature this 6th day of January, 1919.

GUIDO BLENIO.